(12) United States Patent
Mates

(10) Patent No.: US 7,138,826 B2
(45) Date of Patent: Nov. 21, 2006

(54) SELF-REWINDING CIRCUIT

(75) Inventor: John W. Mates, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 10/746,581

(22) Filed: Dec. 24, 2003

(65) Prior Publication Data

US 2005/0146351 A1 Jul. 7, 2005

(51) Int. Cl.
*H03K 19/173* (2006.01)
(52) U.S. Cl. .......................................... 326/38; 326/41
(58) Field of Classification Search ............. 326/38–41
See application file for complete search history.

(56) References Cited

U.S. PATENT DOCUMENTS

| | | | | |
|---|---|---|---|---|
| 4,903,223 A | * | 2/1990 | Norman et al. ............... | 326/39 |
| 5,168,177 A | * | 12/1992 | Shankar et al. ............... | 326/37 |
| 5,436,514 A | * | 7/1995 | Agrawal et al. .............. | 326/41 |
| 5,869,981 A | * | 2/1999 | Agrawal et al. .............. | 326/39 |
| 6,246,260 B1 | * | 6/2001 | Mendel ....................... | 326/41 |
| 6,662,336 B1 | * | 12/2003 | Zook .......................... | 714/786 |
| 6,880,752 B1 | * | 4/2005 | Tarnovsky et al. .......... | 235/382 |

* cited by examiner

*Primary Examiner*—Don Le
(74) *Attorney, Agent, or Firm*—Cynthia Thomas Faatz

(57) ABSTRACT

A self-rewinding circuit includes a first block of combinatorial logic having a set of inputs including at least one input and a set of outputs including at least one output wherein a relationship between the set of inputs and the set of outputs is defined by a first input-output function. A first rewind circuit is coupled between the set of outputs and the set of inputs to implement an inversion of the input-output function.

27 Claims, 7 Drawing Sheets

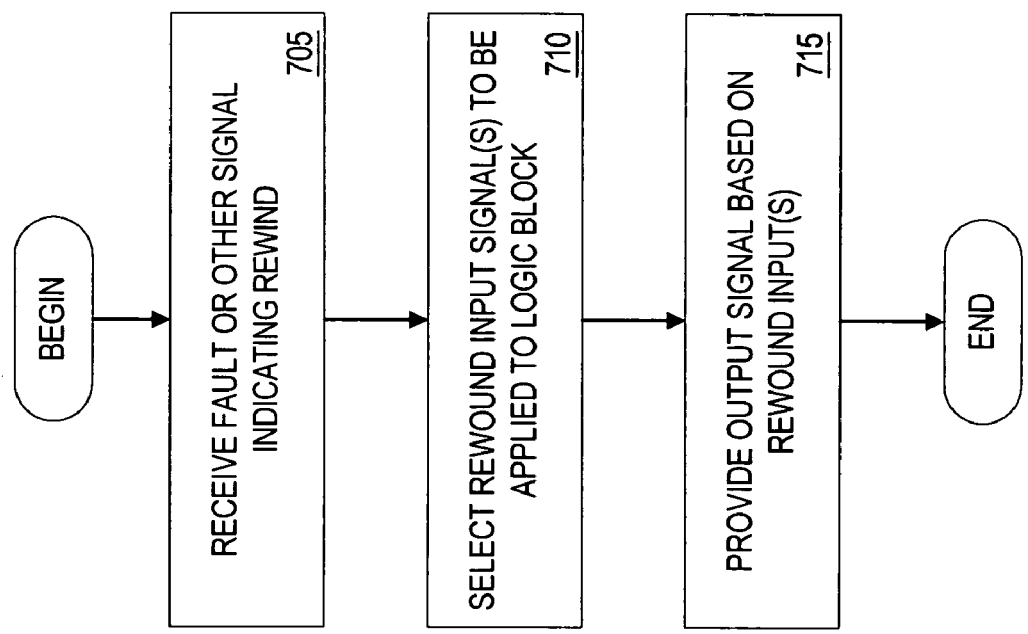

SELF-REWINDING CIRCUIT

BACKGROUND

An embodiment of the present invention relates to the field of integrated circuits and, more particularly, to a circuit capable of rewinding a local state.

Integrated circuit complexity continues to rise. Failure of a circuit, including a highly complex circuit, may cause wider system failure. The performance price for recovering from such failures or "rewinding" may be very high, even though the frequency of such failures may be low.

BRIEF DESCRIPTION OF THE DRAWINGS

The present invention is illustrated by way of example and not limitation in the figures of the accompanying drawings in which like references indicate similar elements, and in which:

FIG. 7 is a flow diagram showing a method of one embodiment for rewinding a local state.

DETAILED DESCRIPTION

A method and apparatus for integrated circuit self-recovery is described. In the following description, particular integrated circuits, circuits, modules, systems, etc. are described for purposes of illustration. It will be appreciated, however, that other embodiments are applicable to other types of integrated circuits, circuits, modules and/or systems, for example.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

For one embodiment, a first block of combinatorial logic has a set of inputs and a set of outputs, where a relationship between the set of inputs and the set of outputs is defined by a first input-output function. A rewind circuit is coupled between the set of outputs and the set of inputs and implements an inversion of the input-output function. For some embodiments, a multiplexer may be used to select between normal inputs to the first block of combinatorial logic and output(s) of the rewind circuit as input(s) to the first block of combinatorial logic. In this manner, a state of the combinatorial logic block may be reversed to a point before a failure (also referred to as replay after rewind), for example. Further details of this and other embodiments are described in more detail below.

Figure 1:
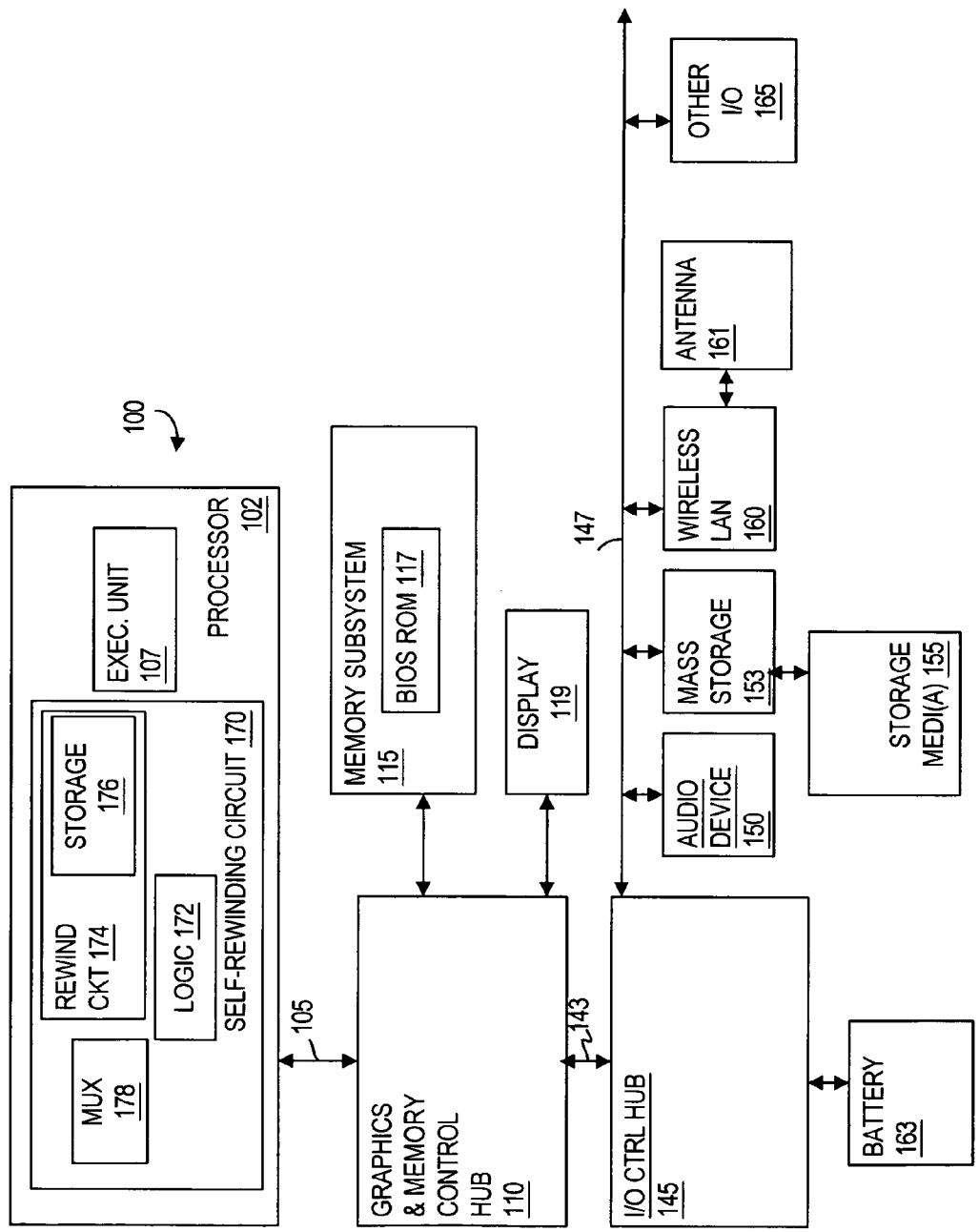
FIG. 1 is a block diagram illustrating a computing system in which the circuit self-recovery approach of one or more embodiments may be advantageously implemented.

FIG. 1 is a block diagram of an exemplary system in which the circuit self-rewind approach of various embodiments may be advantageously implemented. While the example system of FIG. 1 is a personal computer system, it will be appreciated that the local state rewind techniques described herein may be applied to many different types of systems. Examples of such systems include, but are not limited to, personal digital assistants (PDAs), palm top computers, laptop computers, notebook computers, tablet computers, desktop computers, wireless phones, kiosk systems, etc. Virtually any type of system that uses an integrated circuit for which it is desirable to have rewind or failure recovery capabilities is within the scope of one or more embodiments. Rewinding, as the term is used herein, refers to reversing computation for one or more cycles.

The computing system 100 includes a processor 102 coupled to a bus 105. The processor 102 includes an execution unit 107 to execute instructions that may be stored in one or more storage devices in the system 100 or that are otherwise accessible by the system 100.

For one embodiment, the processor 102 may be a processor from the Pentium® family of processors available from Intel Corporation of Santa Clara, Calif. Alternatively, a different type of processor and/or a processor from a different source and/or using a different architecture may be used instead or in addition to the above-described processor. Other types of processors that may be used for various embodiments include, for example, a digital signal processor, an embedded processor or a graphics processor.

A graphics and memory control hub (or GMCH) 110 is also coupled to the bus 105. The graphics and memory control hub 110 may include a memory controller (not shown) that is coupled to a memory subsystem 115. The memory subsystem 115 is provided to store data and instructions to be executed by the processor 102 or any other device included within the electronic system 100. For one embodiment, the memory subsystem 115 may include dynamic random access memory (DRAM). The memory subsystem 115 may, however, be implemented using other types of memory in addition to or in place of DRAM. For some embodiments, the memory subsystem 115 may also include BIOS (Basic Input/Output System) ROM 117. Additional and/or different devices not shown in FIG. 1 may also be included within the memory subsystem 115.

The graphics and memory control hub 110 may also include graphics control capabilities (not shown) that may be provided to control a display 119 and/or other graphics-related device(s).

Also coupled to the graphics and memory control hub 110 over a bus 143 is an input/output (I/O) control hub 145 or other type of I/O controller, which provides an interface to input/output devices. The input/output controller 145 may be coupled to, for example, a Peripheral Component Interconnect (PCI™) or PCI Express™ bus 147 adhering to a PCI Specification such as Revision 2.1 (PCI) or 1.0a (PCI Express) promulgated by the PCI Special Interest Group of Portland, Oreg. For other embodiments one or more different types of buses such as, for example, an Accelerated Graphics Port (AGP) bus according to the AGP Specification, Revision 3.0 or another version, may additionally or alternatively be coupled to the input/output controller 145 or the bus 147 may be a different type of bus.

Coupled to the input/output bus 147 for one embodiment are an audio device 150 and a mass storage device 153, such as, for example, a disk drive, a compact disc (CD) drive, and/or a network device to enable the electronic system 100 to access a mass storage device over a network. An associated storage medium or media 155 is coupled to the mass storage device 153 to provide for storage of software and/or other information to be accessed by the system 100.

The system 100 may also include a wireless local area network (LAN) module 160 and/or an antenna 161 to provide for wireless communications. A battery or other alternative power source adapter 163 may also be provided to enable the system 100 to be powered other than by a conventional alternating current (AC) power source. One or more other I/O devices 165 such as, a keyboard, a cursor control device, etc. may also be coupled to the I/O bus 147 for some embodiments.

It will be appreciated that systems according to various embodiments may not include all the elements described in reference to FIG. 1 and/or may include elements not shown in FIG. 1.

One or more of the integrated circuit devices of FIG. 1 such as, for example, the processor 102 may include a circuit 170 capable of rewinding a local state according to one embodiment. Such a capability may be useful in the event of a need for failure recovery, for example. While the self-rewinding circuit 170 is shown in FIG. 1 as being a part of the processor 102, it will be appreciated by those of ordinary skill in the art that the self-recovering circuit of various embodiments may be provided as part of a different integrated circuit device in addition to, or instead of, the processor 102.

The self-rewinding circuit 170 of one embodiment includes a logic circuit 172 implementing a logic function, and a rewind circuit 174 implementing an inversion of the logic function. Associated storage 176 may be included within the rewind circuit 174 for some embodiments to store input values needed to effectively rewind the state of the logic circuit 172. A multiplexer (mux) 178 may also be provided to selectively apply normal input values or rewound input values (i.e. output values from the rewind circuit 174) to the logic circuit 172 as described in more detail below. For other embodiments, a different type of selection circuitry may instead be used.

Figure 2:
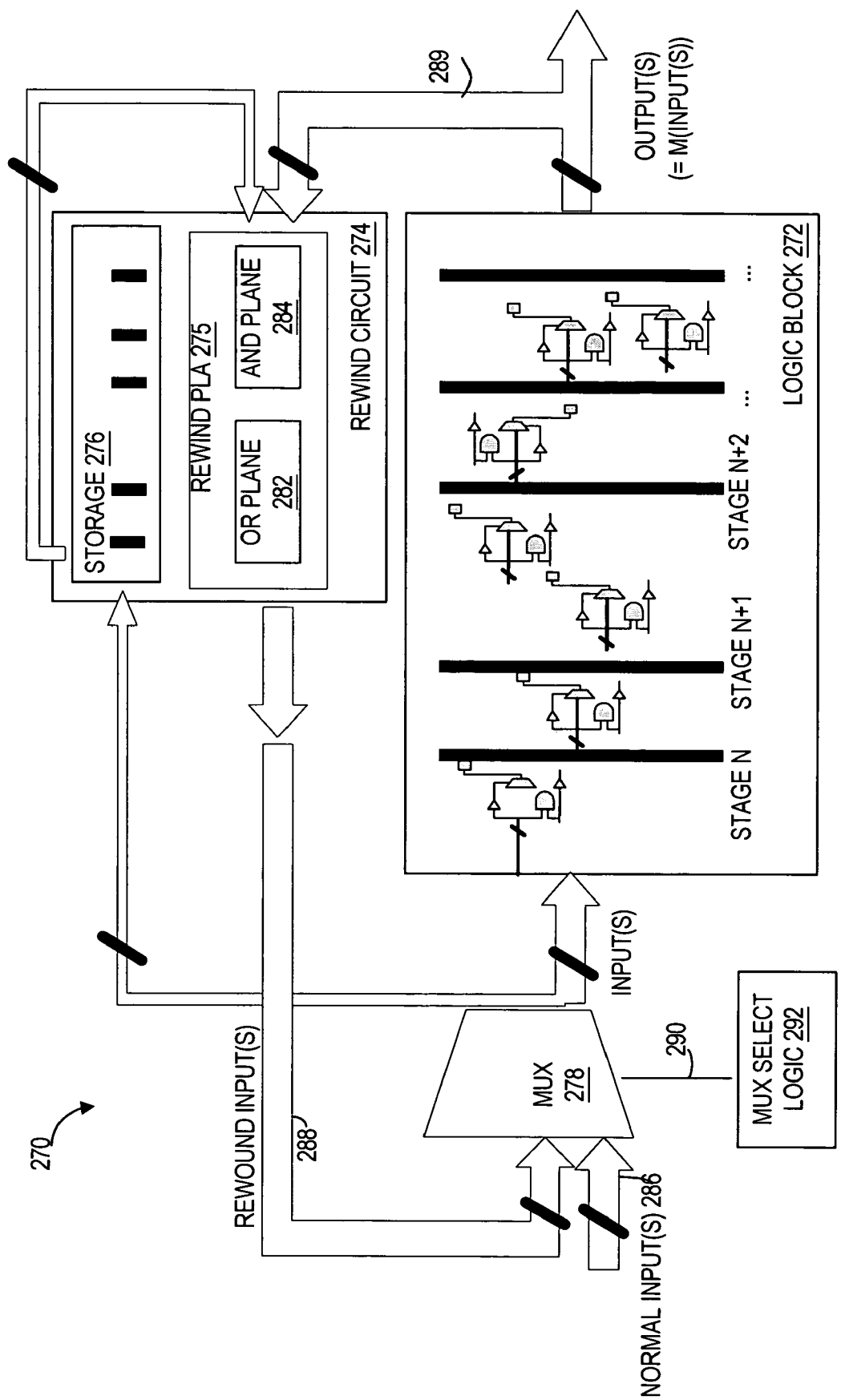
FIG. 2 is a schematic diagram illustrating a combinatorial logic circuit and exemplary associated rewind programmable logic array (PLA) that may be used to implement the self-rewinding approach of one embodiment.

FIG. 2 is a schematic diagram showing a self-rewinding circuit 270 of one embodiment in more detail. The self-rewinding circuit 270 may be used, for example, to provide the self-rewinding circuit 170 of FIG. 1 or in another implementation.

As shown in FIG. 2, a logic block 272 is provided, which may include multiple stages of combinatorial logic. While five stages of combinatorial logic are shown as being part of the logic circuit 272 in FIG. 2 for purposes of illustration, it will be appreciated that a larger or smaller number of stages may be provided for different logic circuits within the scope of one or more embodiments. For this exemplary embodiment, the logic block 272 implements an input-output function M. In other words, the outputs of the logic circuit 272 represent the result of applying a function M to the input(s) to the logic circuit 272.

A rewind circuit 274 is coupled between the output(s) of and the input(s) to the logic block 272. A function of the rewind circuit is to implement a function N that is the inverse of the function M. The rewind circuit 274 of one embodiment may include a rewind programmable logic array (PLA) 275 including an AND plane 282 and an OR plane 284. For such an embodiment, the AND and OR planes 282 and 284 may be programmed in a conventional manner such that the rewind circuit 274 implements the function N.

For some embodiments, particularly where it is not possible or straightforward for the rewind PLA 275 alone to implement an inverse of the function M, a rewind stack or other data structure or rewind storage element 276 may also be provided to store a trace of one or more input signals and/or functions thereof. Where included, the rewind stack 276 may provide particular input value(s) and/or functions of input values that, together with the output value(s) from the logic block 272 are used to drive the rewind PLA 275 input to create the former value of the input to the logic block 272 which led to the current value of its output. For other embodiments, particularly where the rewind PLA 275 or other logic alone is capable of implementing the inverse of the input-output function M provided by the logic block 272, the storage or other data structure 276 may not be included.

A multiplexer (mux) 278 or other selection circuit is coupled to receive the normal input signal(s) to be applied to the logic block 272 during normal operation over a bus 286. The mux 278 is also coupled to receive rewound input signal(s) over a bus 288 to provide for replay after rewind when the rewound input signals are selected. Rewound input signal(s) are provided by the rewind circuit 274 in response to receiving output signal(s) from the logic block 272 over a bus 289.

A multiplexer select signal to control the mux 278 may be provided over a bus 290 and may be controlled by multiplexer select logic 292. The multiplexer select logic 292 may be implemented in a variety of different ways. For one embodiment, for example, the multiplexer select logic 292 may be responsive to one or more fault-related signals such as global "nuke" signals, local reset signals or branch mispredict signals, for example. For other embodiments, the multiplexer select logic 292 may be responsive to other signals such as one or more user-controllable signals that may be used during debug or another operation.

With continuing reference to FIG. 2, during normal operation, the mux select signal is set such that the mux 278 provides the normal input signal(s) to input(s) of the logic block 272. The normal input signal(s) may be provided by, for example, preceding logic (not shown) or another source. The logic block 272 provides associated output signal(s) that are a function M of the input signal(s). These output signal(s) may be provided to downstream logic (not shown).

The output signal(s) are also provided over the bus 289 to input(s) of the rewind circuit 274. For the example shown in FIG. 2, the output signals from the logic block 272 may be provided to inputs of the rewind PLA 275, along with stored input value(s) and/or functions of stored input value(s) from the rewind storage element 276 for some embodiments, such that the rewind circuit 274 is capable of implementing an inverse of the function M. In other words, in response to applying the output signal(s) from the logic block 272 to the input(s) of the rewind circuit 274, the rewind circuit 274 produces output signal(s) that correspond to the input signal(s) that caused the logic block 272 to produce the signal(s) at its output(s).

For embodiments for which a rewind storage element such as the rewind storage element 276 is used, as mentioned above, the rewind storage element 276 may also store some state associated with the logic block 272. The storage element 276 may be implemented in any manner that provides for the stored state to be applied to the rewind PLA or other rewind circuitry to implement the desired inverse function. For one embodiment, for example, the rewind storage element 276 may be x entries deep and operate as a push-down stack. x may be selected based on, for example, the amount of past input information and/or functions thereof that need to be stored to compute the inverse function or the number of cycles for which it is desirable to store information. Using this approach, it may be possible for some embodiments to rewind to a cycle other than the immediately previous cycle.

The rewind storage element 276 may further be y cells wide in order to store values associated with each of y inputs of the rewind PLA 275. For such an embodiment, where y is greater than 1, values corresponding to each of the y inputs of the rewind PLA 275 may be stored in a particular cell such that they can easily be associated with the appropriate input.

For other embodiments, the rewind storage element 276 may be a register or other type of storage element and may, for some exemplary circuits store only a single value. Other approaches for arranging the rewind storage element 276 are within the scope of various embodiments.

With continuing reference to FIG. 2, the output signal(s) from the rewind circuit 274 provide the rewound input signal(s) over the bus 288 to one input of the mux 278. So long as the select signal on the bus 290 is set to provide the normal input signal(s) to the input(s) of the logic block 272, the rewound input signal(s) are blocked and operation continues as described above.

If, however, the value of the select signal on the bus 290 transitions, the rewound input signal(s) are selected to be passed to the logic block 272 input(s) instead of the normal input signal(s). The rewound input signal(s) represent a previous set of normal input signal(s) such that the logic block 272 effectively replays a previous state, or is rewound.

Figure 3:
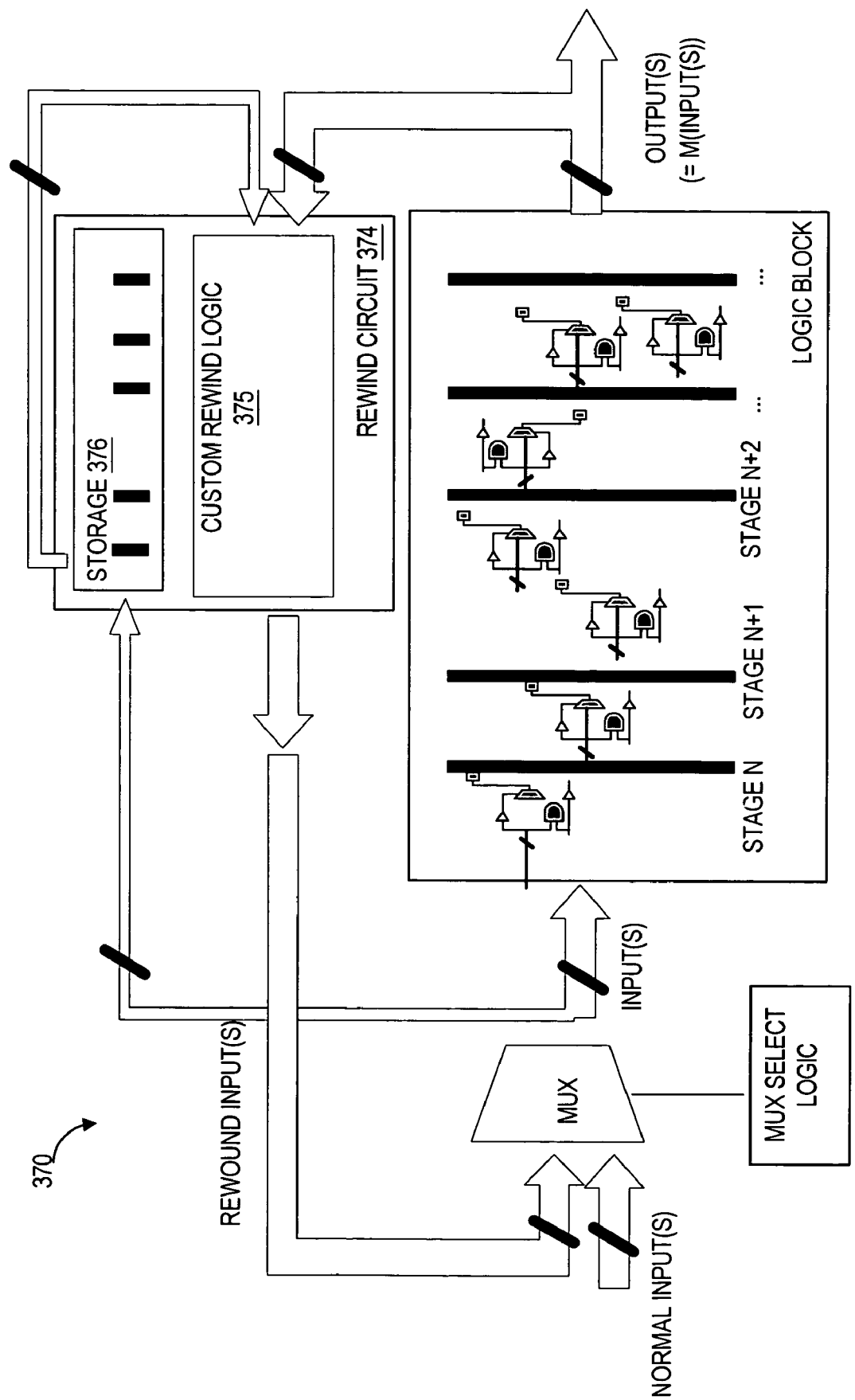
FIG. 3 is a schematic diagram illustrating a combinatorial logic circuit and exemplary associated rewind circuit that may be used to implement the self-rewinding approach of one embodiment.

FIG. 3 is a schematic diagram of a rewind-capable (self-rewinding) circuit 370 for another embodiment. Elements of the rewind-capable circuit 370 are similar in structure, features and operation to corresponding elements of the rewind-capable circuit 270 of FIG. 2, except that the rewind-capable circuit 370 of FIG. 3 includes custom rewind logic 375 in place of the rewind PLA. The custom rewind logic 375 is implemented specifically to provide the inverse of the function M alone or in cooperation with rewind storage 376 as described above. Custom rewind logic 375 includes only the logic necessary to implement the required functionality and therefore, may be advantageous for space-constrained designs. Other approaches for providing rewind logic are within the scope of various embodiments.

Figure 4:
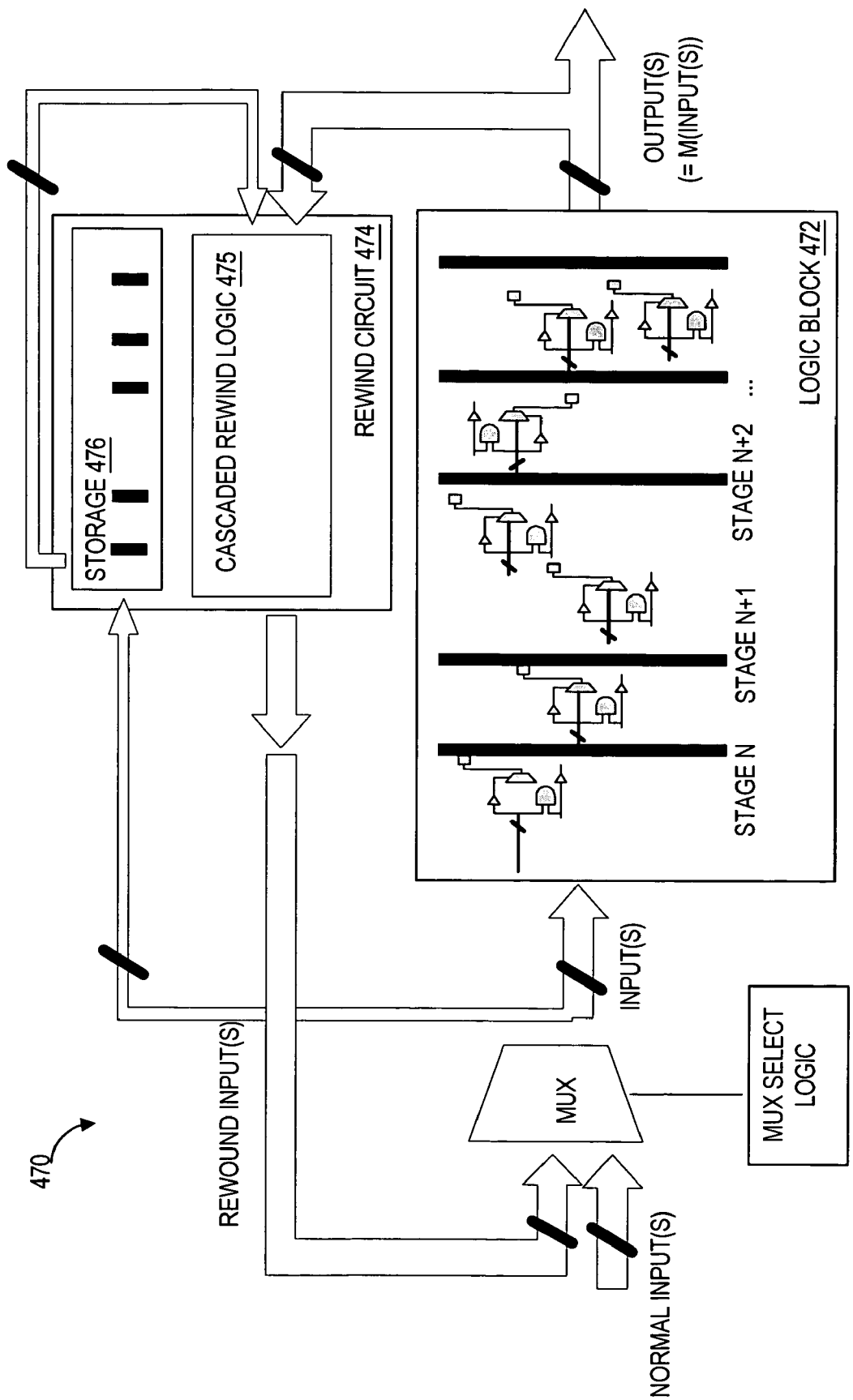
FIG. 4 is a schematic diagram illustrating an exemplary combinatorial logic circuit and associated cascaded rewind circuitry that may be used to implement the self-recovery approach of one embodiment.

FIG. 4 is a schematic diagram illustrating a self-rewinding circuit 470 of yet another embodiment. As with the diagram of FIG. 3, elements of the self-rewinding circuit 470 are similar in structure, features and operation to corresponding elements of the self-rewinding circuit 270 of FIG. 2, except for the rewind logic 475. For the rewind-capable circuit 470, cascaded rewind logic 475 is provided such that the state of the logic block 472 may be rewound by multiple cycles. A cycle in this case may refer to each individual set of input values to the logic block 472. As for the other embodiments, rewind storage may or may not be included in the rewind circuit 474.

Figure 5:
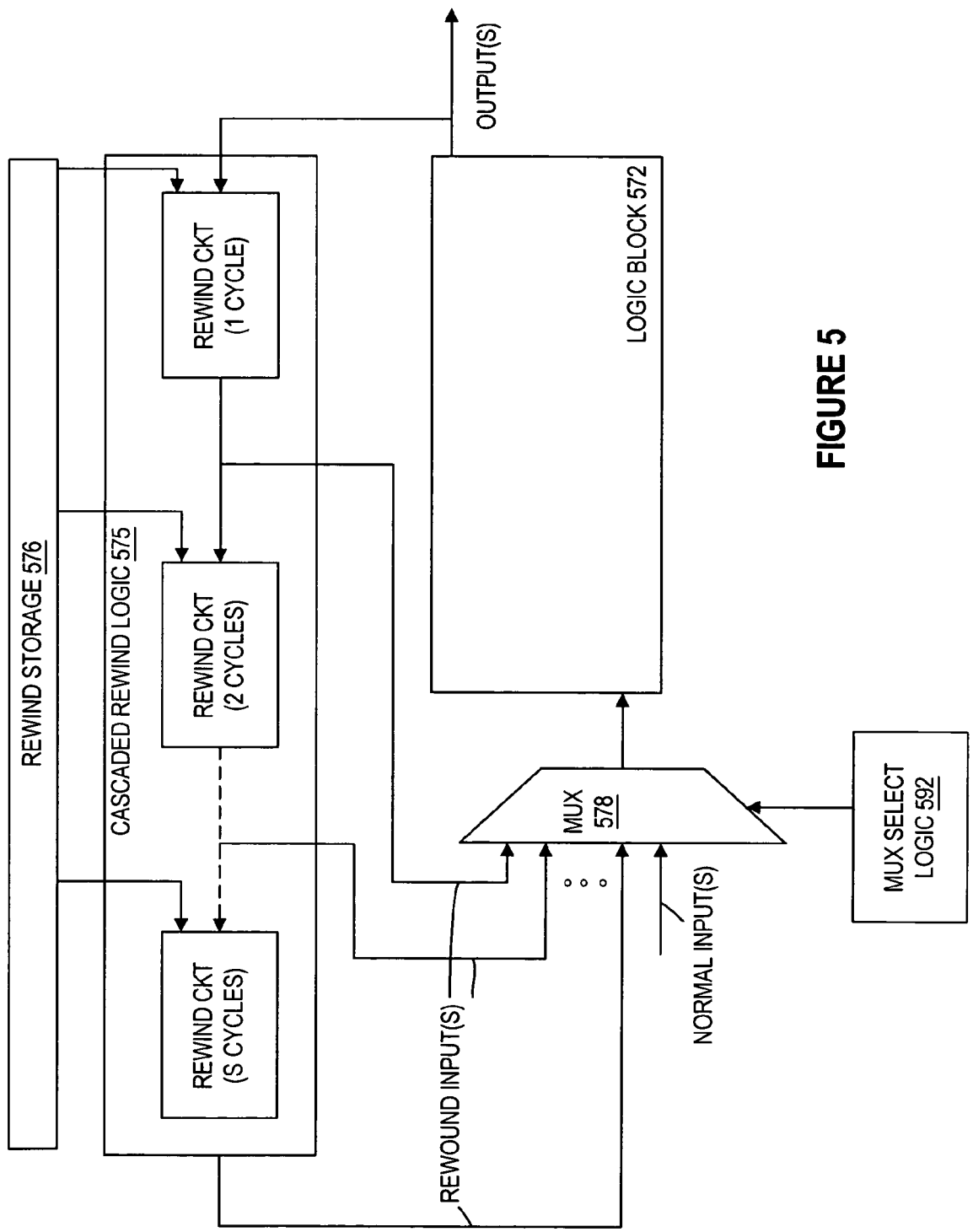
FIG. 5 is a schematic diagram illustrating the combinatorial logic block and cascaded rewind circuitry of FIG. 4 in more detail.

FIG. 5 is a schematic diagram illustrating exemplary cascaded rewind logic 575 that may be used to provide the cascaded rewind logic 475 of FIG. 4. For the example of FIG. 5, S rewind logic blocks (where S is at least 3 in this case) are cascaded as shown with each of the S rewind logic blocks implementing, either alone or in cooperation with rewind storage 576, an inverse of an input-output function M performed by an associated logic block 572. S may be any number (including 2) and may be selected by the designer, for example, in anticipation of a maximum number of rewinds of the state of the logic block 572 that may need to be performed in response to typical failures or for operations that may benefit from rewind capability. Other approaches for selecting S are within the scope of various embodiments.

By cascading rewind logic blocks, the local state of the logic block 572 may be rewound by multiple cycles of input values provided to the logic block 572. This is because each of the logic blocks of the cascaded rewind logic 575 rewinds the input values by one cycle. For such an embodiment, where an associated rewind storage 576 is used, the rewind storage may be configured as a push-down stack that is deep enough to store data for at least the number of rewind cycles provided by the cascaded logic 575.

The mux 578 and associated selection logic 592 for the embodiment of FIG. 5 may also be implemented in a different manner from corresponding elements of FIG. 2 to provide for a selectable number of rewinds. For the example embodiment of FIG. 5, outputs from each of the cascaded rewind logic blocks are provided as rewound inputs to the mux 578. The mux select logic 592 is implemented such that a selection may be made between normal input(s), and anywhere from one to S rewinds depending on what is desired.

For other embodiments, a different selection approach may be used. For example, for some embodiments, it may be desirable to always rewind by the number of input value cycles provided by the cascaded rewind logic 575. For such an example, only the output of the last of the cascaded logic blocks 575 may be coupled to an input of the mux and the selection scheme may be similar to that shown in FIG. 2. For other embodiments, a different subset of rewound outputs may be coupled to inputs of the mux such that a different selection of rewind cycles may be provided.

For various embodiments, including those described above, fuses or another similar approach may be used to selectively enable and/or permanently disable rewind functionality if desired. For example, if self-rewinding circuits are only to be used during a debug process, following debug, rewind aspects of the circuitry may be fused out to reduce power.

For the embodiments described above and for various other embodiments, an exemplary approach to designing a self-rewinding circuit is described in more detail below in reference to FIG. 6.

First, a block of one or more stages of combinatorial logic is selected for which an inverse function is deemed usefully in rewinding a computation at block 605. This selection may be based on a variety of factors including, for example, circuits for which lost cycles have the highest impact, particular areas that are important for debugging, etc.

Then, the input-output relation between the input of the selected logic block and its output is described at block 610. If possible, the inverse function of the input-output relation is then computed at block 615 using only the output signals from the logic block of interest as inputs to the rewind circuit. If an inverse function cannot be computed using only the output signals, then information about prior input signal values is added until an inverse can be computed at block 620. An associated circuit to provide the inverse function is then designed at block 625. Where a PLA is used to provide this circuit, then the PLA is programmed at block 625.

For some embodiments, one or more of the actions associated with blocks 605–625 may be fully or partially automated using currently available integrated circuit design tools. Additionally, some tools may be capable of optimizing the design of rewind circuitry for timing, layout, area, power, or another criteria.

Figure 6:
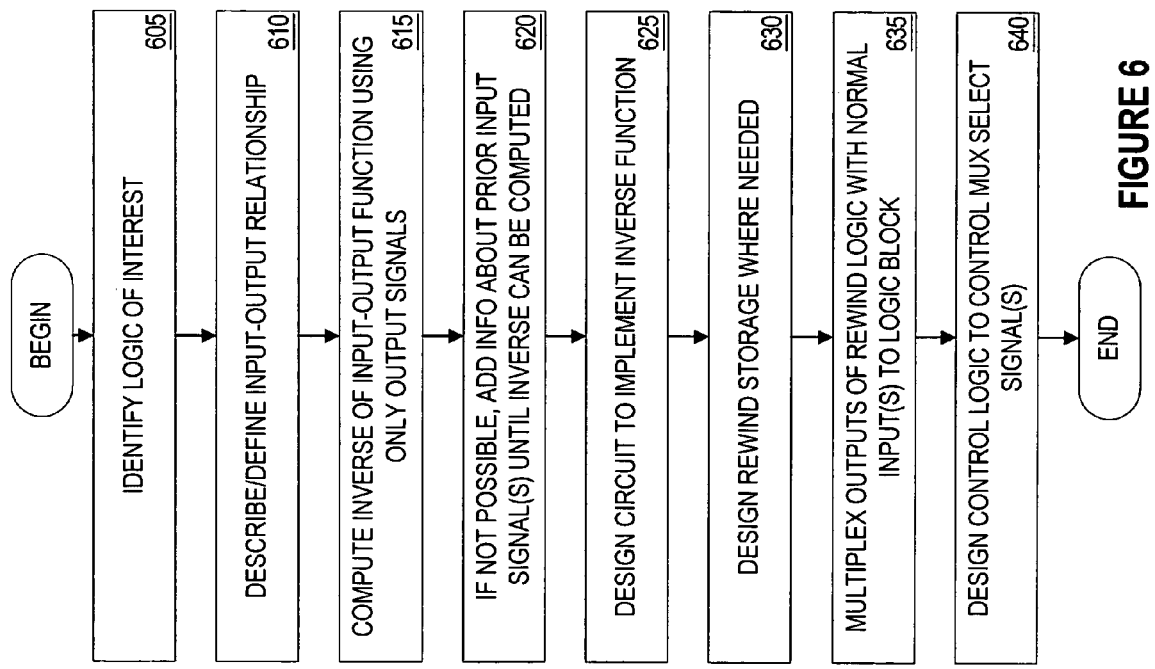
FIG. 6 is a flow diagram showing a method of one embodiment for designing a self-rewinding circuit.

With continuing reference to FIG. 6, where information about prior input signal values is to be added to the circuit to provide the inverse function, a push-down stack or other rewind storage element is then designed at block 630. Where a push-down stack structure is used, the values stored on the top of the stack will be the most recent input values. For a given inverse function, the stored elements of the stack are then connected to inputs of the associated rewind logic to provide the necessary information for the rewind logic to implement the full inverse function.

It will be appreciated that, for some embodiments, designers may not require a full inverse function and may instead choose to assign certain logic block input signal values by default in the rewind phase. Thus, the amount of desired additional information beyond the output values from the associated logic block to get to the desired level of function inversion is a design decision.

It will be further appreciated that there may exist a degenerate case where all input signals to the logic block of interest must be traced (e.g. pushed on a stack) for every cycle. The rewind circuit or PLA in this case would simply implement an identity function and extract the traced input based on the desired prior cycle. Most logic blocks, however, do not require this level of tracing.

At block 635, the output(s) of the rewind logic are multiplexed with an input to the logic block of interest such that the multiplexer is capable of selecting between normal input(s) for normal forward computation by the logic block or rewound input(s) so as to rerun a prior computation of the logic block as described above.

At block 640, control logic to control the multiplexer select line(s) is designed. The control logic may be responsive to local fault signals, global nuke signals, user-controlled debug signals, etc. depending on the anticipated use of the rewind circuitry.

FIG. 7 is a flow diagram illustrating a method of one embodiment for rewinding a local state. At block 705, a fault signal or other signal indicating a need to rewind a local state is received. At block 710, rewound input(s) to a logic block of interest are selected where the rewound input(s) are provided by implementing an inverse of an input-output function implemented by the logic block of interest. At block 715, an output signal is provided based on the rewound-inputs. In this manner, computation may be reversed to a previous cycle.

Using the above-described approaches of one or more embodiments, an on-chip check point and rerun capability at the granularity of a logic block including one or more stages of combinatorial logic may be provided. As compared to currently available capabilities for fault-recovery and the like, the self-rewinding circuitry of one or more embodiments may provide PSMI-like capabilities at a finer granularity and may provide for faster resetting of circuits due to the utilization of local inverse logic functions. (PSMI=periodic System Management Interrupt).

The self-rewinding circuits of one or more embodiments may be useful for a variety of purposes such as failure recovery, testability and/or debug. Built-in self test (BIST) tests, for example, may include repeated local rewinds/reruns of important circuits with successively different additional input parameters implemented using self-rewinding circuits of one or more embodiments.

Thus, various embodiments of a self-rewinding circuit are described. In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a block of combinatorial logic having a set of inputs including at least one input and a set of outputs including at least one output, a relationship between the set of inputs and the set of outputs being defined by a first input-output function; and
a first rewind circuit coupled between the set of outputs and the set of inputs, the rewind circuit to implement an inversion of the input-output function.

2. The apparatus of claim 1 wherein the first rewind circuit comprises a programmable logic array (PLA).

3. The apparatus of claim 2 wherein the first rewind circuit further comprises rewind storage to store at least one value to be provided to the PLA such that the PLA implements the inversion of the input-output function.

4. The apparatus of claim 1 further comprising at least a second rewind circuit cascaded with the first rewind circuit between the set of outputs and the set of inputs, each of the rewind circuits to implement the inversion of the input-output function.

5. The apparatus of claim 4 wherein each of the first and at least second rewind circuits includes rewind storage to store at least one value to be provided to the respective rewind circuit such that the respective rewind circuit implements the inversion of the input-output function.

6. The apparatus of claim 5 further comprising selection logic to select between one of the outputs of: the rewind circuits and an input provided from another source.

7. The apparatus of claim 1 further comprising selection logic to select between an output of the rewind circuit and an input provided from another source.

8. The apparatus of claim 7 wherein the selection logic comprises a multiplexer.

9. An apparatus comprising:
a combinatorial logic block including at least a first input and at least a first output, the combinatorial logic block to implement a first input-output function;
a first rewind circuit having at least a first input coupled to the at least first output of the combinatorial logic block, and at least a first output, the first rewind circuit to implement a second function that is an inversion of the first function; and
selection logic to selectively couple one of: the at least first output of the rewind circuit and an input from another source to the at least first input of the combinatorial logic block.

10. The apparatus of claim 9 wherein the first rewind circuit comprises a programmable logic array.

11. The apparatus of claim 10 wherein the first rewind circuit further comprises a storage element to store at least one value to be used by the rewind circuit to implement the second function.

12. The apparatus of claim 9 wherein the first rewind circuit is included in a chain of cascaded rewind circuits, the chain of cascaded rewind circuits being coupled between the at least first input and at least first output of the combinatorial logic block, each of the rewind circuits in the chain of cascaded rewind circuits to implement the second function.

13. The apparatus of claim 12 wherein the selection logic is further to selectively couple at least one of the outputs from one of the rewind circuits of the chain of cascaded rewind circuits and an input from another source to the at least first input of the combinatorial logic block.

14. The apparatus of claim 13 wherein each of the rewind circuits in the chain of cascaded rewind circuits is further coupled to a rewind storage element the rewind storage elements to store at least one value to be used by the respective rewind circuit to implement the second function.

15. The apparatus of claim 13 wherein the selection logic is controlled by at least one of a local reset signal, a global reset signal, a debug signal and user input.

16. A method comprising:
selectively applying an input value from a first source to at least one input of a combinatorial logic block during a first mode of operation; and
in response to a control signal, selectively applying a rewound input value from a rewind circuit to the combinatorial logic block, the rewind circuit being coupled between at least one output and the at least one input of the combinatorial logic block, the rewound input corresponding to a previous value of an input to the combinatorial logic block.

17. The method of claim 16 wherein selectively applying the rewound input value from the rewind circuit includes selectively applying the rewound value from a programmable logic array.

18. The method of claim 16 wherein selectively applying the rewound input value from the rewind circuit includes selectively applying a rewound input value corresponding to a value at least two cycles prior to the control signal being asserted.

19. A system comprising:
a bus to communicate information;
an antenna coupled to the bus to provide for wireless communications; and
a processor coupled to the bus, the processor including
a block of combinatorial logic having a set of inputs including at least one input and a set of outputs including at least one output, a relationship between the set of inputs and the set of outputs being defined by a first input-output function; and
a first rewind circuit coupled between the set of outputs and the set of inputs, the rewind circuit to implement an inversion of the input-output function.

20. The system of claim 19 wherein the first rewind circuit comprises a programmable logic array (PLA).

21. The system of claim 20 wherein the first rewind circuit further comprises rewind storage to store at least one value to be provided to the PLA such that the PLA implements the inversion of the input-output function.

22. The system of claim 19 wherein the processor further comprises at least a second rewind circuit cascaded with the first rewind circuit between the set of outputs and the set of inputs, each of the rewind circuits to implement the inversion of the input-output function.

23. The system of claim 22 wherein each of the first and at least second rewind circuits includes rewind storage to store at least one value to be provided to the respective rewind circuit such that the respective rewind circuit implements the inversion of the input-output function.

24. The system of claim 23 further comprising selection logic to select between one of: the outputs of the rewind circuits and an input provided from another source.

25. The system of claim 24 wherein the selection logic is responsive to at least one of a local reset signal, a global nuke signal, a debug signal and user input.

26. The system of claim 19 wherein the processor further comprises selection logic to select between an output of the rewind circuit and an input provided from another source.

27. The system of claim 26 wherein the selection logic comprises a multiplexer.

* * * * *